(12) United States Patent
Huynh et al.

(10) Patent No.: US 8,373,095 B2
(45) Date of Patent: Feb. 12, 2013

(54) POWER LINE DE-ICING APPARATUS (76) Inventors: Tung Minh Huynh, N. Andover, MA (US); Anthony Minh Truong Huynh, N. Andover, MA (US); Alyssa Baotram Huynh, N. Andover, MA (US)

( * ) Notice: Subject to any disclaimer, the term of this patent is extended or adjusted under 35 U.S.C. 154(b) by 995 days.

(21) Appl. No.: 12/410,041

(22) Filed: Mar. 24, 2009

(65) Prior Publication Data
US 2010/0243631 A1    Sep. 30, 2010

(51) Int. Cl.
H05B 3/00    (2006.01)
(52) U.S. Cl. ................................. 219/200; 174/40 R
(58) Field of Classification Search ............ 219/209, 219/200, 213, 203, 262, 483–486, 502, 507, 219/508, 505, 481, 494, 201; 174/40 R, 174/42, 45, 115, 128.1, 149 R
See application file for complete search history.

(56) References Cited

U.S. PATENT DOCUMENTS
6,660,934 B1 *  12/2003  Nourai et al. ............... 174/40 R
2007/0240786 A1 *  10/2007  Gass et al. ................... 144/420

FOREIGN PATENT DOCUMENTS
WO    WO/2006/002224 A1    1/2006
WO    WO 2006/002224 A2 *  1/2006
WO    WO/2007/114785 A1    10/2007
WO    WO 2007/114785 A1 *  10/2007
WO    WO/2010/111326 A1    9/2010

OTHER PUBLICATIONS

International Search Report for International Application No. PCT/US2010/028402, issued May 19, 2010 by the International Bureau of WIPO.
Written Opinion of the International Search Authority International Search Report for International Application No. PCT/US2010/028402, issued May 19, 2010 by WIPO.
International Preliminary Report on Patentability Chapter I (IB/373) for International Application No. PCT/US2010/028402, issued Sep. 27, 2011 by WIPO.

* cited by examiner

Primary Examiner — Henry Yuen
Assistant Examiner — Phuong Nguyen
(74) Attorney, Agent, or Firm — Daniel N. Smith (57) ABSTRACT A power line de-icing apparatus which is installed onto a power line without the need for disconnecting the power line. A temperature sensor and an ice sensor on the apparatus automatically activate the de-icing mode of operation. An internal motor and drive wheel move the apparatus along the power line in both directions, one direction at a time. Heaters and chisels on the apparatus remove any ice on the power line in one direction at a time. Power for the apparatus is generated from the electrical power carried by the power line using transformers. Proximity sensors on the apparatus detect stopping devices placed on the power line to stop the motion of the apparatus.

18 Claims, 5 Drawing Sheets

POWER LINE DE-ICING APPARATUS

FIELD OF THE INVENTION

This invention relates to a novel apparatus for de-icing power lines.

BACKGROUND OF INVENTION

Ice accumulated on power lines during ice storms applies additional weight and pressure to the power lines and often causes the power lines to break or detach from the supporting posts, or even breaks the posts and causes power interruptions. It is impractical, time consuming and too expensive for power maintenance companies to constantly send workers to de-ice power lines in most areas. These resources are best spent fixing power lines brought down by storms and restoring power to residential and commercial structures as opposed to working preemptively to prevent other power lines from collapsing.

Several previous inventions have been developed that attempt to solve the problem of accumulated ice on power lines. For example, U.S. Pat. No. 2,870,311, Greenfield et al. disclose an electrical cable structure that contains an inner conductor and an outer conductor separated by an insulating material. When ice forms on these cables, a strong current is passed through the outer conductor to cause it to increase in heat, thereby melting the ice on the cable. U.S. Pat. No. 3,316,344, Kidd et al., and U.S. Pat. No. 3,316,345, Toms et al., disclose an electrical cable structure with an exterior composed of a magnetic material. When the outside temperature falls below a given range, this magnetic material allows more current to pass through, thereby causing the material to increase in heat and melt any ice on the cable. U.S. Pat. No. 3,835,269, Levin et al. disclose a device for de-icing a wire by generating electromagnetic pulses on the wire. The device is installed in close proximity to the wire and transported along the wire by a vehicle. U.S. Pat. No. 4,212,378, Hrovat discloses a device for de-icing power cables consisting of wheeled dollies mounted on a cable. These devices have scrapers for removing ice from the cable. U.S. Pat. No. 5,411,121, LaForte et al. disclose a device for de-icing cables which includes one pair of conductive wires connected to and helically wound along the cable. The conductive wires are connected to a pulsing device which generates an electromagnetic pulse within the wires which creates a repulsive force between the wires, which shakes the wires and shatters the ice that may be attached to the cable.

None of the above inventions disclose an effective and inexpensive apparatus that can be set to automatically de-ice power lines during ice storms with minimal power consumption and supervision.

The apparatus of the present invention provides many benefits to maintaining the integrity of power lines during ice storms.

SUMMARY OF THE INVENTION

The subject invention discloses an apparatus for de-icing a power line, the apparatus comprising: a housing; an internal hollow channel traversing the housing from a first opening on a first end of the housing to a second opening on a second end of the housing; wherein the housing is placed over the power line such that a portion of the power line is contained within the internal hollow channel and extends through the first opening and the second opening; a rotatable wheel contained within the housing, wherein the rotatable wheel engages the power line for rolling movement therealong; a motor contained within the housing, wherein the motor is operably connected to the rotatable wheel; a temperature sensor attached to the housing; an ice sensor attached to the housing; a first plurality of heating elements attached to the housing proximate to the first opening, wherein the first plurality of heating elements operably provide heat within the first opening and an exterior portion of the housing proximate to the first opening; a second plurality of heating elements attached to the housing proximate to the second opening, wherein the second plurality of heating elements operably provide heat within the second opening and an exterior portion of the housing proximate to the second opening; a first physical proximity sensor attached to the housing proximate to the first opening; a second physical proximity sensor attached to the housing proximate to the second opening; a first power transformer contained within the housing, wherein the first power transformer generates electrical power for the apparatus from electrical power carried by the power line; and a control unit contained within the housing; wherein the control unit is operationally connected to the motor, temperature sensor, ice sensor, motion sensor, first plurality of heating elements, second plurality of heating elements, first physical proximity sensor, second physical proximity sensor and first power transformer.

In one embodiment of the subject invention, the housing is connected over the hanging power line without disconnecting the power line.

In a further embodiment of the subject invention, the housing further comprises a lid.

In one embodiment of the subject invention, the internal hollow channel comprises a U shape.

In another embodiment of the subject invention, the apparatus further comprises a motion sensor contained within the housing, wherein the motion sensor is proximate to the internal hollow channel for detecting movement along the power line.

In a further embodiment of the subject invention, the motion sensor comprises an optical encoder.

In another embodiment of the subject invention, the motion sensor is selected from the group consisting of ultrasonic, optical, microwave, and video motion detectors.

In one embodiment of the subject invention, the motor rotates the rotatable wheel in either direction along the power line.

In a further embodiment of the subject invention, the apparatus further comprises a rotatable balance wheel that engages the power line within the internal channel and moves along the power line.

In another embodiment of the subject invention, the apparatus further comprises a first plurality of scraper members proximate to the first opening, and a second plurality of scraper members proximate to the second opening, wherein the first and second pluralities of scraper members are normally not engaging the power line, but being operable responsively to a signal from the control unit to move into scraping engagement with the power line.

In another embodiment of the subject invention, the apparatus further comprises at least two stop members affixed to the power line in a space apart relation therealong and each operable to prevent the passage of the apparatus thereby.

In one embodiment of the subject invention, the apparatus further comprises a second power transformer contained within the housing, wherein the second power transformer generates electrical power for the apparatus from electrical power carried by the power line.

In a further embodiment of the subject invention, the first physical proximity sensor and the second physical proximity sensor are selected from the group consisting of pressure, temperature, differential and optical sensors.

In another embodiment of the subject invention, the temperature sensor is selected from the group consisting of infrared hear sensors, optical pyrometer, fiber optic thermometer, an acoustic meter, an ultrasonic meter, thermocouples, bimetallic elements, temperature probes and or a heat sensor.

The subject invention also discloses a method for de-icing a hanging power line comprising the steps of: a) attaching an apparatus comprising a housing over the power line without disconnecting the hanging power line by placing the power line within an internal hollow channel traversing the housing such that the power line extends through a first opening and a second opening in the housing, and further that the power line engages a rotatable wheel contained within the housing; b) generating electrical power for the apparatus by charging a power transformer contained within the housing from electrical power carried by the power line; c) detecting ambient temperature with a temperature sensor attached to the housing, wherein a detected temperature between 27 to 35° F. sends a first signal from the temperature sensor to a control unit contained within the housing; d) detecting ice formed on an ice sensor attached to the housing, wherein a pre-determined amount of ice sends a second signal to the control unit; e) activating a motor contained within the housing, wherein the motor operates the rotatable wheel to move the apparatus along the power line in a first direction; f) activating an ice sensor heating element to provide heat to the ice sensor to melt accumulated ice thereon; g) activating a first plurality of heating elements attached to a first side of the housing that is moving forward in the first direction, wherein the first plurality of heating elements provide heat to the first side of the housing; h) activating a first plurality of scraper members attached to the first side of the housing that is moving forward in the first direction, wherein the first plurality of scraper members move into scraping engagement with the power line; i) detecting a first stop member affixed to the power line with a first physical proximity sensor attached to the first side of the housing and sending a third signal to the control unit; j) de-activating the motor and the first plurality of heating elements and disengaging the first plurality of scraper members from the power line; k) detecting ice formed on the ice sensor attached to the housing, wherein the pre-determined amount of ice sends a fourth signal to the control unit, further wherein if ice is detected on the ice sensor then activating the motor to operate the rotatable wheel, wherein the rotatable wheel moves the apparatus along the power line in a second direction, otherwise docking at the first stop member if no ice is detected; l) activating a second plurality of heating elements attached to a second side of the housing that is moving forward in the second direction, wherein the second plurality of heating elements provide heat to the second side of the housing; m) activating a second plurality of scraper members attached to the second side of the housing that is moving forward in the second direction, wherein the second plurality of scraper members move into scraping engagement with the power line; n) detecting a second stop member affixed to the power line with a second physical proximity sensor attached to the second side of the housing and sending a fifth signal to the control unit; o) de-activating the motor and the second plurality of heating elements and disengaging the second plurality of scraper members from the power line; p) detecting ice formed on the ice sensor attached to the housing, wherein the pre-determined amount of ice sends a sixth signal to the control unit; and q) repeating steps e) through k) above if ice is detected on the ice sensor, otherwise docking at the second stop member if no ice is detected.

In another embodiment of the subject invention, the method further comprises a rotatable balance wheel that engages the power line within the internal channel and moves along the power line.

An alternative embodiment of the subject invention is an apparatus for de-icing a hanging power line, the apparatus comprising: a housing comprising a first section and a second section, wherein the first section is hingedly connected to the second section to form the housing; an internal hollow channel traversing the housing from a first opening on a first end of the housing to a second opening on a second end of the housing; wherein the first section and the second section of the housing are connected over the power line such that a portion of the power line is contained within the internal hollow channel and extends through the first opening and the second opening; a rotatable wheel contained within the housing, wherein the rotatable wheel engages the power line for rolling movement therealong, further wherein the rotatable wheel is mounted for rotation on an axis transverse to and above the power line; a motor contained within the housing, wherein the motor is operably connected to the rotatable wheel; a temperature sensor attached to the housing; an ice sensor attached to the housing; a first plurality of heating elements attached to the housing proximate to the first opening, wherein the first plurality of heating elements operably provide heat within the first opening and an exterior portion of the housing proximate to the first opening; a second plurality of heating elements attached to the housing proximate to the second opening, wherein the second plurality of heating elements operably provide heat within the second opening and an exterior portion of the housing proximate to the second opening; a first physical proximity sensor attached to the housing proximate to the first opening; a second physical proximity sensor attached to the housing proximate to the second opening; a first power transformer contained within the housing, wherein the first power transformer generates electrical power for the apparatus from electrical power carried by the power line; and a control unit contained within the housing; wherein the control unit is operationally connected to the motor, temperature sensor, ice sensor, motion sensor, first plurality of heating elements, second plurality of heating elements, first physical proximity sensor, second physical proximity sensor and first power transformer, wherein when the temperature sensor detects an ambient temperature between 27 to 35° F. or the ice sensor detects ice formed thereon, the control unit actuates the motor to operate the rotatable wheel along a given direction on the power line, further wherein the control unit activates the plurality of heating elements proximate to the side of the housing that is moving forward in the given direction, wherein when the physical proximity sensor proximate to the side of the housing moving forward along the given direction detects a non-ice object, the control unit actuates the motor to operate the rotatable wheel in the opposite direction along the power line, further wherein the control unit deactivates the plurality of heating elements distal to the side of the housing that is moving forward in the given direction and activates the plurality of heating elements proximate to the side of the housing that is moving forward in the opposite direction, wherein the apparatus controls to move in both directions along the power line until the ice sensor detects no more ice.

In another embodiment of the subject invention, the first section and the second section are unequal in size.

In another embodiment of the subject invention, the apparatus further comprises a remote control receiver and transmitter for a user interface operationally connected to the control unit.

In another embodiment of the subject invention, the control unit further comprises an internal programmable microprocessor and a control program.

In a further embodiment of the subject invention, the motor is connected to the first power transformer to receive electrical energy for operation. In another embodiment of the subject invention, the ice sensor is connected to the first power transformer to receive electrical energy for operation. In one embodiment of the subject invention, the temperature sensor is connected to the first power transformer to receive electrical energy for operation. In another embodiment of the subject invention, the first and second physical proximity sensors are connected to the first power transformer to receive electrical energy for operation. In a further embodiment of the subject invention, the control unit is connected to the first power transformer to receive electrical energy for operation. In one embodiment of the subject invention, the first and second pluralities of heating elements are connected to the second power transformer to receive electrical energy for operation.

There are additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto. These together with other objects of the invention, along with the various features of novelty, which characterize the invention, are pointed out with particularity in the claims annexed to and forming a part of this disclosure.

For a better understanding of the invention, its operating advantages and the specific objects attained by its uses, reference should be made to the accompanying drawings and descriptive matter in which there are illustrated preferred embodiments of the invention. Other features and advantages of the present invention will become apparent from the following description of the preferred embodiment(s), taken in conjunction with the accompanying drawings, which illustrate, by way of example, the principles of the invention.

BRIEF DESCRIPTION OF THE DRAWINGS

Advantages of the present invention will be apparent from the following detailed description of exemplary embodiments thereof, which description should be considered in conjunction with the accompanying drawings, in which.

DETAILED DESCRIPTION OF THE PREFERRED EMBODIMENTS

While several variations of the present invention have been illustrated by way of example in preferred or particular embodiments, it is apparent that further embodiments could be developed within the spirit and scope of the present invention, or the inventive concept thereof. However, it is to be expressly understood that such modifications and adaptations are within the spirit and scope of the present invention, and are inclusive, but not limited to the following appended claims as set forth.

Figure 1:
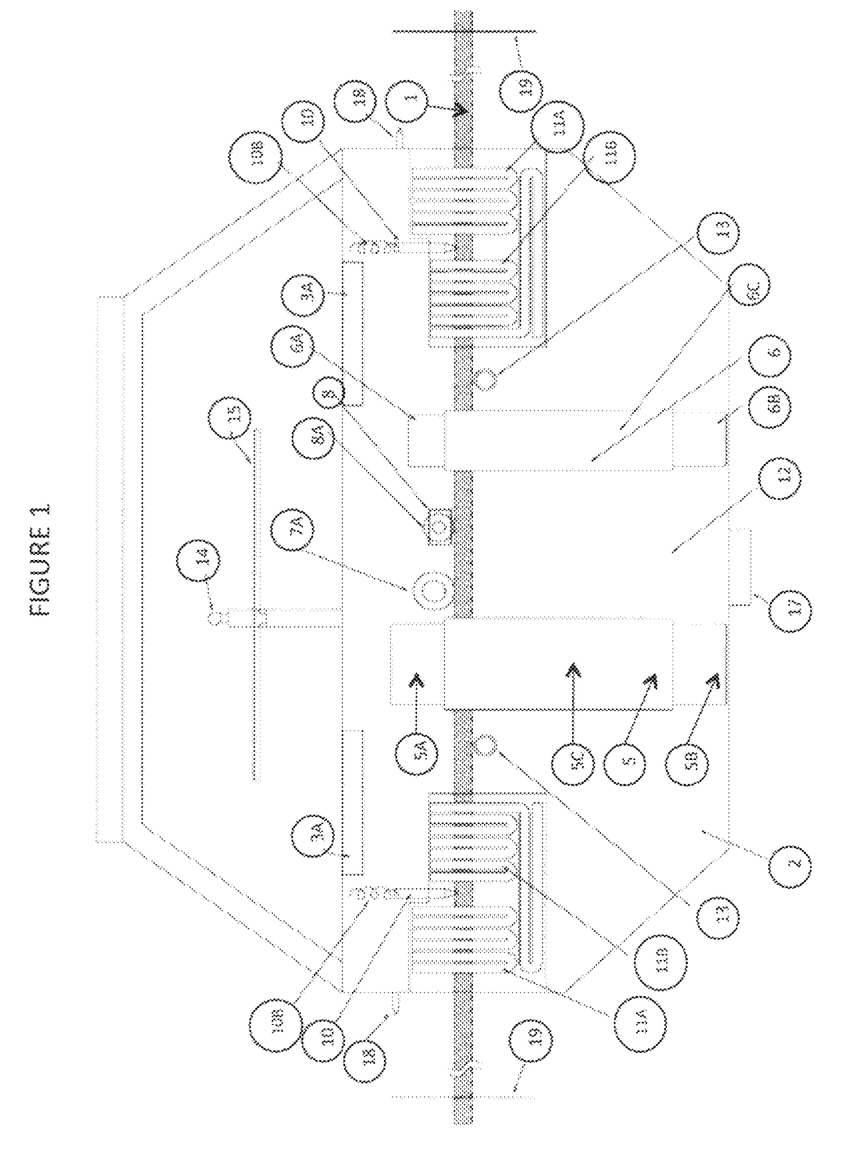
FIG. 1 illustrates a cross-sectional view of a de-icing apparatus.
Figure 2:
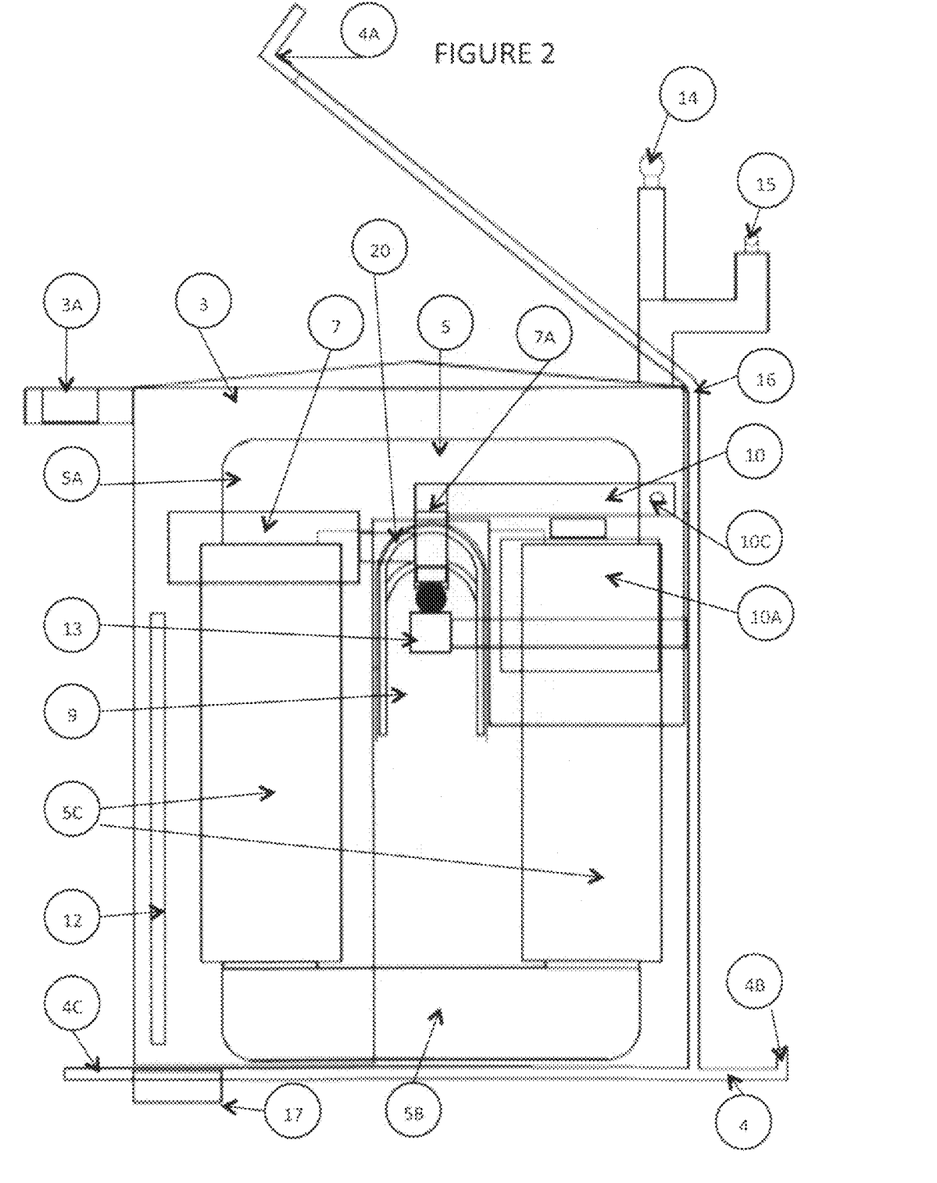
FIG. 2 illustrates a side view of the de-icing apparatus in the operational position.
Figure 3:
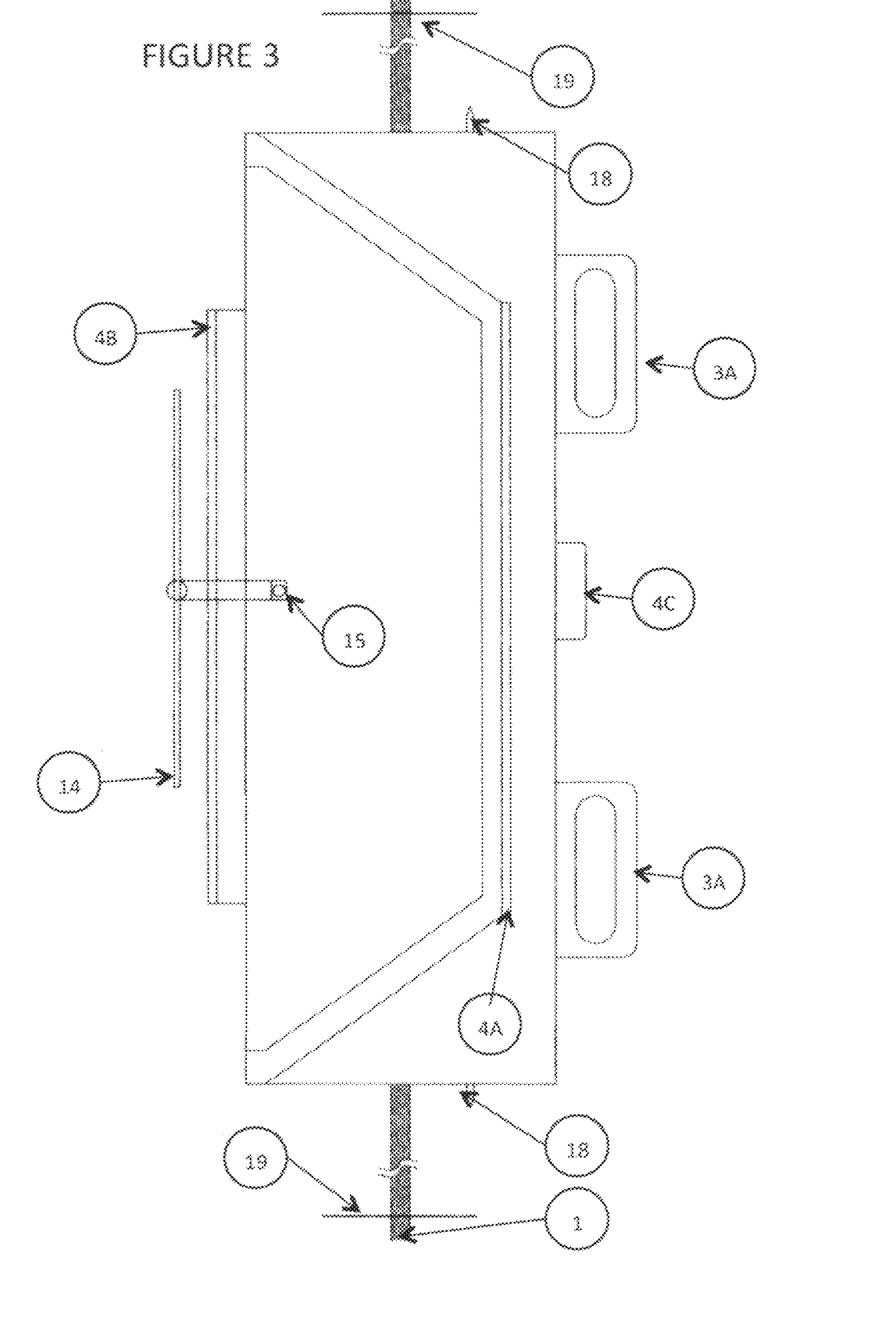
FIG. 3 illustrates a top view of the de-icing apparatus.

FIGS. 1, 2 and 3 illustrate the preferred embodiment of the subject invention which comprises an apparatus 2 with built-in heaters 11 and chisels 10 for de-icing an ice-covered power line 1. The apparatus 2 comprises a housing 3 and a cover 4. A hinge 16 connects the housing 3 and the cover 4. In one embodiment of the subject invention, the hinge 16 is a mechanical hinge with a latch-open position to secure the cover 4 to the housing 3. The cover 4 is locked tight over the housing 3 by a magnetic lock 17 once the apparatus 2 is installed on the power line 1. In one embodiment of the subject invention, the magnetic lock 17 is a flat piece of permanent magnetic, secured to the end of the cover 4 near the unlock flange 4C.

When the cover 4 is in closed position, the magnetic lock 17 will pull the cover toward the housing 3 and locks it tight.

In one embodiment of the subject invention, the cover 4 is an "L" shape that is hinged to the housing 3 on the top corner. The cover 4 contains an opening lever 4A for a user to pull and open the cover, a closing flange 4B for a user to close the opened cover and an unlock flange 4C for a user to unlock the magnetic lock 17 when the cover 4 is closed.

The housing 3 comprises a hollow traverse channel 9 for containing the power line 1. In one embodiment of this subject invention, this channel 9 comprises an upside down "U" shape.

The housing 3 also comprises a main transformer 5 and an auxiliary transformer 6 that use the power line 1 as their primary winding to generate electrical power on their secondary windings 5C and 6C, respectively, for use within the apparatus 2. These are current transformers and thus the output current is equal to the current on the power line 1 divided by the number of turns on their secondary 5C and 6C. The raw power generated by the transformers 5 and 6 is proportional to the current on the power line 1. Part of the electronics system 12 is used to regulate power for each transformer to fulfill the power requirements for different modes of operations.

The main transformer 5 consists of a main "U" core 5A which comprises an upside down "U" shape and a main "I" core 5B which comprises an "I" shape.

The auxiliary transformer 6 operates with less power but in the same manner as the main transformer 5. The auxiliary transformer 6 consists of an auxiliary "U" core 6A (smaller than the main "U" core 5A) which also comprises an upside down "U" shape and an auxiliary "I" core 6B (smaller than the main "I" core 5B) which comprises an "I" shape.

All cores 5A, 5B, 6A, and 6B are made of magnetic material such as silicon steel or ferrite.

The main "U" core 5A and the auxiliary "U" core 6A reside in the housing 3 and sit in the center of the apparatus 2, perpendicular to the power line 1 to create the hollow traverse channel 9 to contain the power line 1. The secondary bobbins and windings 5C are inserted over the main "U" core 5A legs. The secondary bobbins and windings 6C are inserted over the auxiliary "U" core 6A legs.

The cover 4 contains the main "I" core 5B and the auxiliary "I" core 6B. When the apparatus 2 is installed over the power line 1, the main "I" core 5B connects to the secondary bobbins and windings 5C and the auxiliary "I" core 6B connects to secondary bobbins and windings 6C to close the magnetic path for the main transformer 5 and the auxiliary transformer 6. The cover 4 is closed and locked to the housing 3 by the magnetic lock 17.

In one embodiment of this subject invention, the main transformer 5 is used to power the heaters 11 and chisels 10 in the de-icing mode, and its power regulator shuts it off during stand-by mode. In another embodiment of this subject invention, the main transformer 5 may generate power from 50 to 300 watts from electrical power carried by power line 1.

In one embodiment of this subject invention, the auxiliary transformer 6 is used to power the electronics system 12 and a driving motor 7. In another embodiment of this subject invention, the auxiliary transformer 6 may generate power from 30 to 70 watts from electrical power carried by power line 1.

In one embodiment of this subject invention, the motor 7 is a geared DC motor that can operate both directions along the power line 1, forward and reverse. The motor 7 provides rotating force to drive a drive wheel 7A. The drive wheel 7A rests on the power line 1 within the hollow traverse channel 9 of housing 3. When the motor 7 operates the drive wheel 7A, the force of the rotating drive wheel 7A causes the apparatus 2 to move along the power line 1, in either direction.

The apparatus 2 may further comprise one or more internal motion sensors for detecting movement along the power line 1. In different embodiments of the subject invention, this motion sensor may be contained within the driving wheel 7A, the balancing wheel 13 or be a separate sensor.

In one embodiment of the subject invention, the motion sensor comprises an optical encoder 8 which generates electronic signals based on angular movement of its shaft. The shaft is connected to an encoder wheel 8A which rests on the power line 1. Once the apparatus 2 is moved on the power line 1 by the drive motor 7 and drive wheel 7A, the encoder wheel 8A will roll on the power line 1 and thus generate angular movement. This angular movement is translated by the encoder 8 to an electrical signal for the electronics system 12 to process.

In another embodiment of the subject invention, the motion sensors may comprise a motion sensor is selected from the group consisting of ultrasonic, optical, microwave, and video motion detectors. It will be understood that the sensors could be implemented with a variety of sensing technologies for a variety of ambient conditions. All such variations come within the spirit and scope of the present invention.

The housing further contains two chisels 10 which are two dull "V" shaped steel blades with fulcrums 10C at a far end. Each chisel 10 is attached to a spring 10B to pull each of them up to clear the power line 1. Each chisel 10 is driven by a solenoid 10A which will magnetically pull the steel blades down toward, but not touching, the power line 1. The solenoids 10A which will pull the steel blades down at a high velocity, three to ten times per second, to chip off loose ice barrels from the power line 1 after the ice has been heated and de-bonded from the power line 1.

Heaters 11 of the apparatus 2 have the upside-down "U" shape to form the traverse channel 9 in the same manner as the transformers 5 and 6. Heaters 11 are designed in two sections, each made of heating elements.

The first section of the heaters 11, the ice heater 11A, is located on both ends of apparatus 2. Ice heater 11A has a large gap between the heating elements and the power line 1 to accommodate the size of ice attached to the power line 1. As the motor 7 drives the drive wheel 7A to move the apparatus 2 along the power line 1 in a given direction, the heater 11 and chisel 10 in that same given direction begin to heat and chip at any ice attached to the power line. While the apparatus 2 continuously moves along the power line 1 in a given direction, the heater 11 in that direction will first try to melt the ice off the power line 1. If this ice is not completely melted off the power line 1 by ice heater 11A, the chisel 10 will try to chip it off. During that time, a small section of heater 11, the cable heater 11B is heating up the power line 1 to de-bond the ice from the power line 1 so that it is easier for the chisel 10 to chip it off.

If any ice is still attached to the power line 1 after the cable heater 11B has passed, this ice will block a balance wheel 13 and prevent the apparatus 2 from moving forward along the power line 1. This pause in forward movement gives heater 11 and chisel 10 more time to remove the ice until the balance wheel 13 can roll over the ice-cleared section of power line 1.

If there is ice still present on the power line 1 that does not block the balance wheel 13, this ice will eventually block the drive wheel 7A since it is slippery and prevent the apparatus 2 from moving forward along the power line 1. This pause in forward movement gives heater 11 and chisel 10 more time to remove the ice until the balance wheel 13 can roll over the ice-cleared section of power line 1.

The apparatus 2 may also include balance wheels 13 attached to the cover 4. The shafts of the balance wheels 13 are designed with a spring-like material. This spring-like material pushes the balance wheels 13 upward onto the power line 1 in order to pull the apparatus 2 downwards against the power line 1. When the cover 4 is open, the balance wheels 13 are out of the channel 9 so the apparatus 2 can be installed over the power line 1. Once the apparatus 2 is installed over the power line 1, the cover 4 can be closed and the balance wheels 13 pull the apparatus 2 downwards against the power line 1 to lock the apparatus 2 onto the power line 1.

When the apparatus 2 is closed, balance wheels 13 rest on the power line 1 within the hollow traverse channel 9 of housing 3. When the motor 7 operates the drive wheel 7A, the balance wheel 13 also moves along power line 1 to provide additional balance of the apparatus 2 on the power line 1. The balance wheel 13 may also rotate in either direction along the power line 1.

In another embodiment of the subject invention, the safety guards (not shown) may be placed around the power line 1 in hollow traverse channel 9 to provide additional guidance to the apparatus 2.

In another embodiment of the subject invention, the apparatus 2 further includes an electronics system 12 which contains power regulators for transformers 5 and 6, an internal programmable microprocessor, a control program and hardware for analog and digital circuitry. In one embodiment of the subject invention, the electronics system 12 may comprise an exterior user interface for updates and maintenance to the apparatus.

The functions of the electronics system 12 are to:
1. Regulate power from transformers 5 and 6 based on the following modes of operation:
   a) Stand-by Mode;
   b) De-icing Mode; and
   c) Testing Mode (Externally controlled).

2. Process information from the encoder 8, the end-of-line sensors 18, the temperature sensor 14, the ice sensor 15 and remote signals from a remote control (not shown) to make decisions for the operation.
3. Do a self-check operation of the apparatus 2 on a routine basis and when this operation is commanded remotely by a user.

The ice sensor 15 is a small hollow metal rod mounted horizontally above and outside the housing 3 to avoid any snow build-up. The rod is supported by a weight-sensitive micro-switch. When a designated weight limit of ice accumulates on the rod, the micro-switch will be turned "ON" which sends an electrical signal to the electronics system 12. The electronics system 12 will confirm that ice has formed on the ice sensor 15 and then activate the de-icing operation of apparatus 2. The rod is small enough such that snow, sleet or rain will not accumulate on it. Only ice will accumulate on the rod.

After the electronics system 12 has activated the de-icing operation of apparatus 2, it will then momentarily turn on a small heating element inside ice sensor 15 to melt off the ice attached to the rod and the micro-switch returns to "OFF". Once the heater inside the rod is turned OFF, the rod will cool off naturally to the ambient temperature and start to accumulate ice again, if any ice is present. The apparatus 2 will travel, at least once, from one end of the power line 1 to the other end of the power line 1 in the de-icing operation before the electronics system 12 will check for ice on the ice sensor 15 again.

In one embodiment of the subject invention, the apparatus 2 will only dock or rest at either end of the power line 1 in the stand-by mode and after a de-icing mode.

In other embodiments of the subject invention, the ice sensor 15 may be contact or non-contact sensors for detecting the presence of ice or another physical object located on the power line 1. In another embodiment of the subject invention, the ice sensors 15 may include, but are not limited to pressure, temperature differential, or optical sensors. It will be understood that the sensors could be implemented with a variety of sensing technologies for a variety of ambient conditions. All such variations come within the spirit and scope of the present invention.

A temperature sensor 14 is mounted on top of the apparatus 2 on a corner of housing 3. This placement of the temperature sensor 14 prevents a misreading of the temperature due to snow cover or heat generated from the heaters 11 of apparatus 2.

In one embodiment of the subject invention, the temperature sensor 14 may contain a transducer that generates an analog voltage at the rate of 10 mV/C, starting with 750 mV at 25 C, or any equivalent temperature sensors. This voltage is sent to the electronics system 12.

In other embodiments of the subject invention, the temperature sensor 14 is preferably a non-contact sensor, which is not required to come in contact with any ice in order to detect the temperature. In another embodiment of the subject invention, the temperature sensors may include, but are not limited to infrared hear sensors, optical pyrometer, fiber optic thermometer, an acoustic meter, an ultrasonic meter, thermocouples, bimetallic elements, temperature probes, or a heat sensor. It will be understood that the sensors could be implemented with a variety of sensing technologies for a variety of ambient conditions. All such variations come within the spirit and scope of the present invention.

The apparatus 2 also contains end-of-line sensors 18 that are micro-switches at either end of the apparatus 2. The end-of-line sensors 18 are located above the heater 11 so that they won't freeze or be covered with snow. When the apparatus 2 comes close to end-of-line stoppers 19, the end-of-line sensor 18 may contact or detect the end-of-line stopper 19 and send a signal to the electronics system 12 to stop the motor 7 and the drive wheel 7A, thus stopping the motion of the apparatus 2 on the power line 1. In other embodiments of the subject invention, the end-of-line sensors 18 may be contact or non-contact sensors for detecting the presence of ice or another physical object located on the power line 1. In another embodiment of the subject invention, the end-of-line sensors 18 may include, but are not limited to pressure, temperature differential, or optical sensors. It will be understood that the sensors could be implemented with a variety of sensing technologies for a variety of ambient conditions. All such variations come within the spirit and scope of the present invention.

In one embodiment of the subject invention, the end-of-line stoppers 19 are two round pieces of metal or other hard materials with a hole and some flanges in the center that are tied to the power line 1. In one embodiment of the subject invention, the end-of-line stoppers 19 may be added to the power line 1 to dictate a pre-determined length of power line 1 that the apparatus 2 may act upon.

The electronics system 12 of apparatus 2 is electrically connected to the ice sensors, the internal motion sensors, the temperature sensors and the end-of-line sensors. The electronics system 12 can respond to electrical signal outputs from the sensors without limitation.

All of the electrical components of the subject invention, including the motor 7, the sensors 8, 14, 15 and 18, the electronics system 12 and the heaters 11 may all be directly connected to the either the main 5 or auxiliary transformer 6 through cables or wires to receive electrical energy for operation.

In an alternative embodiment of the subject invention, if the apparatus 2 is installed on a non-power line to de-ice it, all of the electrical components of the subject invention may be connected to a rechargeable battery (not shown).

The apparatus 2 may also contain heat shields 20 over the heaters 11 to protect the components near the heaters 11 from heat generated by the heaters 11.

Installation of the Apparatus.

Figure 4:
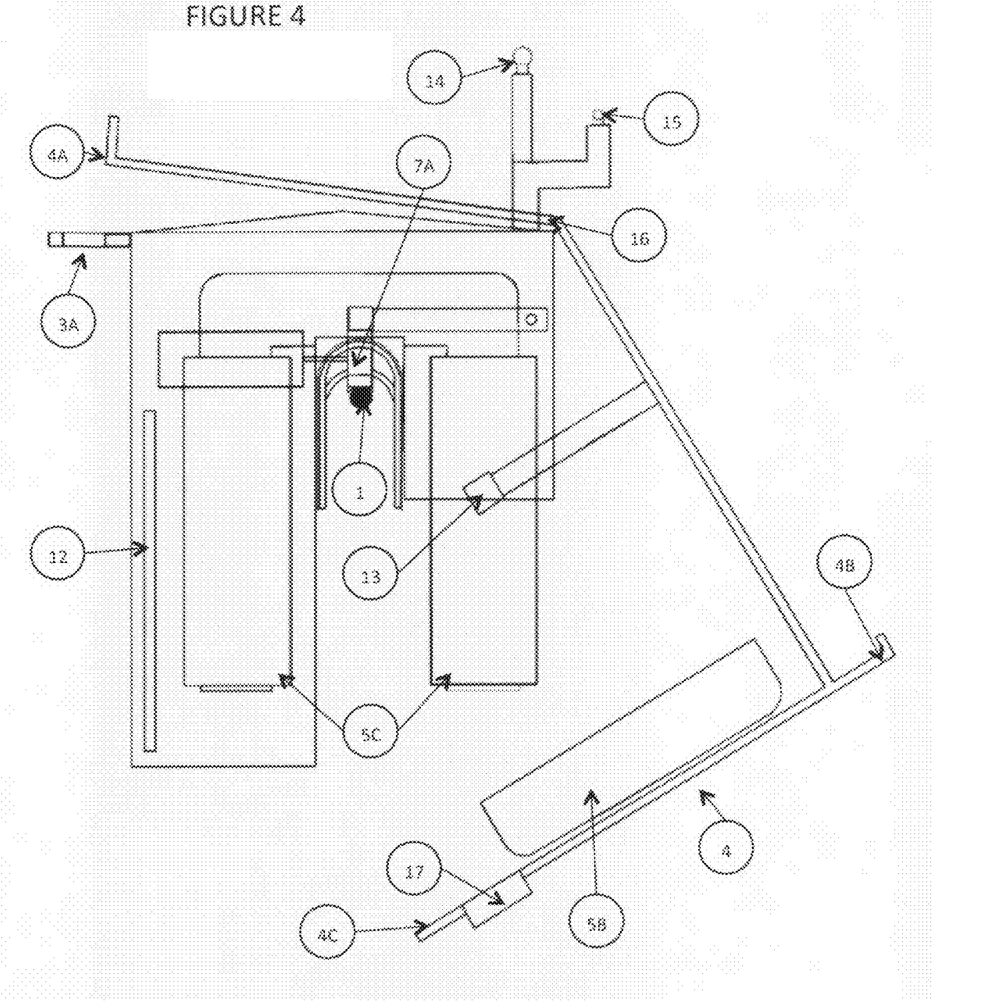
FIG. 4 illustrates a side view of the de-icing apparatus in the installing position.
Figure 5:
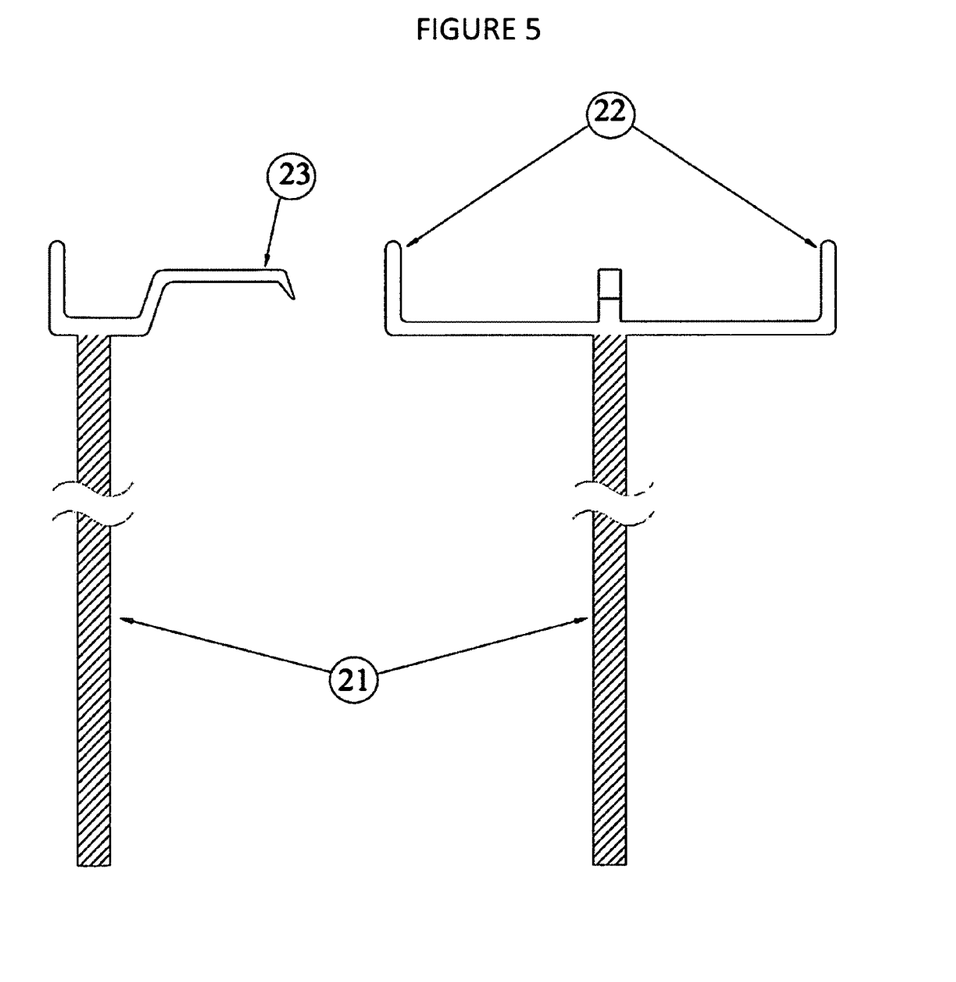
FIG. 5 illustrates a front and side view of an installation rod.

Apparatus 2 may be installed onto the power line 1 without power interruption. The apparatus 2 can be installed by trained personnel from an electrically-safe distance when in an open position (as shown in FIG. 4) via a non-conducting installation rod 21 with forks 22 and hooks 23 (as shown in FIG. 5).

As shown in FIG. 3, the housing 3 has two ears 3A on the top corner that can receive the hooks 23 of forks 22 from the installation rod 21. Once the apparatus 2 is secured to the installation rod 21 through ears 3A, the installation rod 21 should be raised to lift the apparatus 2, in the open position, up to the power line 1, and then lowered to put the apparatus 2 onto the power line 1. The apparatus 2 sits on the power line 1 with the drive wheel 7A and the encoder wheel 8A.

With the cover 4 open, the traverse channel 9 of housing 3 is clear and the apparatus 2 can be hooked onto the power line 1. The power line 1 should rest within traverse channel 9 of apparatus 2. The point of gravity for apparatus 2 is below the power line 1; thus, apparatus 2 remains upward, hanging from the power line 1. At this stage, the cover 4 is open and the two "I" cores 5B and 6B for the two transformers 5 and 6, and the two balance wheels 13 are not in position. The cover 4 is now at its latch-open position.

The cover 4 has a closing lever 4B on the lower corner which can be pulled down by a hook 23 from the installing rod 21 to close the cover 4. Once the cover 4 is closed, the two "I"

cores 5B and 6B for the transformers 5 and 6 will come in place to close the magnetic paths and the magnetic lock 17 will keep the cover 4 from becoming loose from the housing 3.

The balance wheels 13 will come in contact with power line 1 before the cover 4 is completely closed. As the cover 4 is closed, there will be upward pressure on the power line 1 from the balance wheels 13 to help lock the apparatus 2 onto power line 1. Once the apparatus 2 is closed, the balance wheels 13 will cause more pressure between the power line 1 and the drive wheel 7A and encoder wheel 8A for better traction.

The apparatus 2 usually docks near an end-of-line stopper 19 which is usually the highest point from the ground.

A user can remotely move the apparatus 2 toward the center of the power line span so that it may be uninstalled. The cover 4 has the unlock flange 4C at the low corner of the apparatus 2. A user can use a hook 23 from the installation rod 21 to pull this flange to unlock the cover 4 from the housing 3. Once it is unlocked, a user may use the same hook 23 to pull the opening lever 4A to pull the cover 4 into its latch-open position and remove the apparatus from the power line 1.

To remove the apparatus, the fork 22 from the installation rod 21 is installed into ears 3A and the apparatus is lifted up and out of the power line 1.

Operation of the Apparatus

The apparatus of the subject invention is designed to keep a power line 1 from accumulating too much ice while operating using minimum power consumption and to prevent wear and tear on the apparatus 2.

The electronics system 12 of the apparatus 2 determines the directions and modes and of operation. The three (3) modes of operation of the apparatus are as follows:
a) Stand-by Mode;
b) De-icing Mode; and
c) Testing Mode (Remotely controlled).

When the apparatus 2 is first installed on the power line 1, the main transformer 5 and the auxiliary transformer 6 use the power line 1 to generate electrical power for the apparatus 2. The apparatus 2 powers the motor 7 and the drive wheel 7A to move along power line 1.

In one embodiment of the subject invention, once the apparatus 2 reaches one of the end-of-line stoppers 19 it docks in "stand-by" or "power-save" mode. The two end-of-line stoppers 19 are located near each of the adjacent posts connected to the power line 1. In another embodiment of the subject invention, the apparatus 2 travels at least once from one end of the power line 1 to the other end in the de-icing mode and then determines if more de-icing is needed or if it enter Stand-by mode. The apparatus 2 can go in either direction to cover to the power line span between the two adjacent posts. It will reverse direction when the end-of-line sensor 18 on the forward direction comes in contact with one of the end-of-line stoppers 19.

The "Stand-by" mode for the apparatus 2 is the mode in which the apparatus 2 does not operate any motion in the motor 7 or heat in the heaters 11. The apparatus 2 performs necessary house-keeping operations to maintain operational capacity.

The apparatus always monitors the external ambient temperature and will continuously search for ice once the temperature falls within the temperature window from 25° F. to 35° F.

When the temperature sensor 14 detects a local temperature range from 25° F. to 35° F., the apparatus 2 will begin checking for ice formed on the ice sensor 15. When a designated weight limit of ice accumulates on the rod, the micro-switch will be turned "ON" which sends an electrical signal to the electronics system 12. The electronics system 12 will confirm that ice has formed on the ice sensor 15 and then activate the de-icing operation of apparatus 2. The electronics system 12 is responsible for eliminating miss-readings including wild animals, wind vibrations or anything other than ice.

After the electronics system 12 has activated the de-icing operation of apparatus 2, it will then momentarily turn on a small heating element inside ice sensor 15 to melt off the ice attached to the rod. The information from the ice sensor 15 will not be read again until the apparatus has reached the end-of-line stopper 19 on the opposite end of the power line.

At the beginning of the de-icing cycle, main transformer 5 is used to power the heaters 11 and chisels 10 in the direction that the apparatus 2 will move once the motor 7 provides rotating force to the drive wheel 7A. Before the apparatus 2 even begins to move along the power line 1, the heaters 11 and chisel 10 on the given direction start to melt and break the ice off the power line 1. Solenoids 10A on chisels 10 pull the steel blades down at a high velocity, three to ten times per second, to chip off loose ice barrels from the power line 1.

About thirty seconds later, the motor 7 starts provide rotating force to the drive wheel 7A to move the apparatus along the power line 1. The apparatus 2 will move at its own pace based on how fast it can clear the ice on the power line 1.

As the motor 7 drives the drive wheel 7A to move the apparatus 2 along the power line 1 in a given direction, the heater 11 and chisel 10 in that same given direction begin to heat and chip at any ice attached to the power line. While the apparatus 2 continuously moves along the power line 1 in a given direction, the heater 11 in that direction will first try to melt the ice off the power line 1. If this ice is not completely melted off the power line 1 by ice heater 11A, the chisel 10 will try to chip it off. During that time, a small section of heater 11, the cable heater 11B is heating up the power line 1 to de-bond the ice from the power line so that it is easier for the chisel 10 to chip it off.

If any ice is still attached to the power line 1 after the cable heater 11B has passed, this ice will block a balance wheel 13 and prevent the apparatus 2 from moving forward along the power line 1. This pause in forward movement gives heater 11 and chisels 10 more time to remove the ice until the balance wheel 13 can roll over the ice-cleared section of power line 1

If there is ice still present on the power line 1 that does not block the balance wheel 13, this ice will eventually block the drive wheel 7A since it is slippery and prevent the apparatus 2 from moving forward along the power line 1. This pause in forward movement gives heater 11 and chisels 10 more time to remove the ice until the balance wheel 13 can roll over the ice-cleared section of power line 1

Based on latent energy required to melt ice, the chisel 10 is the most energy efficient method to remove ice from power line providing the ice is not tightly bonded to the power line.

In other embodiments of the subject invention, variations in the size and shape of the apparatus may be incorporated to allow it to be used on different power lines based on their diameters, nominal currents, distance in cable span and local climate.

In another embodiment of the subject invention, if the apparatus 2 becomes stuck in one place, it will try to go back and forth to "rock" itself out of the obstacle.

When the apparatus 2 reaches the other end of the power line, the electronics system 12 will check the information on the temperature sensor 14 and the ice sensor 15 again to take appropriate action.

The final mode of operation, the Testing mode, is initiated by a user of the apparatus through input of an external signal to the electronics system 12 to test the various operations of the apparatus. The power maintenance company can remotely test the apparatus at any time to make sure it is operational for the next ice storms. During the test, the apparatus will perform a complete self-test for some predetermined period of time and then to a stand-by mode.

What is claimed is:

1. An apparatus for de-icing a power line, the apparatus comprising:
   a housing;
   an internal hollow channel traversing the housing from a first opening on a first end of the housing to a second opening on a second end of the housing, wherein the housing is placed over the power line such that a portion of the power line is contained within the internal hollow channel and extends through the first opening and the second opening;
   a rotatable wheel contained within the housing, wherein the rotatable wheel engages the power line for rolling movement therealong;
   a motor contained within the housing, wherein the motor is operably connected to the rotatable wheel;
   a temperature sensor attached to the housing;
   an ice sensor attached to the housing;
   a first plurality of heating elements attached to the housing proximate to the first opening, wherein the first plurality of heating elements operably provide heat within the first opening and an exterior portion of the housing proximate to the first opening;
   a second plurality of heating elements attached to the housing proximate to the second opening, wherein the second plurality of heating elements operably provide heat within the second opening and an exterior portion of the housing proximate to the second opening;
   a first physical proximity sensor attached to the housing proximate to the first opening;
   a second physical proximity sensor attached to the housing proximate to the second opening;
   a first power transformer contained within the housing, wherein the first power transformer generates electrical power for the apparatus from electrical power carried by the power line; and
   a control unit contained within the housing; wherein the control unit is operationally connected to the motor, temperature sensor, ice sensor, motion sensor, first plurality of heating elements, second plurality of heating elements, first physical proximity sensor, second physical proximity sensor and first power transformer.

2. The apparatus of claim 1, wherein the housing is connected over the hanging power line without disconnecting the power line.

3. The apparatus of claim 1, wherein the housing further comprises a lid.

4. The apparatus of claim 1, wherein the internal hollow channel comprises a U shape.

5. The apparatus of claim 1, further comprising a motion sensor contained within the housing, wherein the motion sensor is proximate to the internal hollow channel for detecting movement along the power line.

6. The motion sensor of claim 5, wherein the motion sensor comprises an optical encoder.

7. The motion sensor of claim 5, wherein the motion sensor is selected from the group consisting of ultrasonic, optical, microwave, and video motion detectors.

8. The apparatus of claim 1, wherein motor rotates the rotatable wheel in either direction along the power line.

9. The apparatus of claim 1, further comprising a rotatable balance wheel that engages the power line within the internal channel and moves along the power line.

10. The apparatus of claim 1, further comprising a first plurality of scraper members proximate to the first opening, and a second plurality of scraper members proximate to the second opening, wherein the first and second pluralities of scraper members are normally not engaging the power line, but being operable responsively to a signal from the control unit to move into scraping engagement with the power line.

11. The apparatus of claim 1, further comprising at least two stop members affixed to the power line in a space apart relation therealong and each operable to prevent the passage of the apparatus thereby.

12. The apparatus of claim 1, further comprising a second power transformer contained within the housing, wherein the second power transformer generates electrical power for the apparatus from electrical power carried by the power line.

13. The apparatus of claim 1, wherein the first physical proximity sensor and the second physical proximity sensor are selected from the group consisting of pressure, temperature, differential and optical sensors.

14. The apparatus of claim 1, wherein the temperature sensor is selected from the group consisting of infrared hear sensors, optical pyrometer, fiber optic thermometer, an acoustic meter, an ultrasonic meter, thermocouples, bimetallic elements, temperature probes and or a heat sensor.

15. A method for de-icing a hanging power line comprising the steps of:
   a) attaching an apparatus comprising a housing over the power line without disconnecting the hanging power line by placing the power line within an internal hollow channel traversing the housing such that the power line extends through a first opening and a second opening in the housing, and further that the power line engages a rotatable wheel contained within the housing;
   b) generating electrical power for the apparatus by charging a power transformer contained within the housing from electrical power carried by the power line;
   c) detecting ambient temperature with a temperature sensor attached to the housing, wherein a detected temperature between 27 to 35° F. sends a first signal from the temperature sensor to a control unit contained within the housing;
   d) detecting ice formed on an ice sensor attached to the housing, wherein a pre-determined amount of ice sends a second signal to the control unit;
   e) activating a motor contained within the housing, wherein the motor operates the rotatable wheel to move the apparatus along the power line in a first direction;
   f) activating an ice sensor heating element to provide heat to the ice sensor to melt accumulated ice thereon;
   g) activating a first plurality of heating elements attached to a first side of the housing that is moving forward in the first direction, wherein the first plurality of heating elements provide heat to the first side of the housing;
   h) activating a first plurality of scraper members attached to the first side of the housing that is moving forward in the first direction, wherein the first plurality of scraper members move into scraping engagement with the power line;
   i) detecting a first stop member affixed to the power line with a first physical proximity sensor attached to the first side of the housing and sending a third signal to the control unit;

j) de-activating the motor and the first plurality of heating elements and disengaging the first plurality of scraper members from the power line;
k) detecting ice formed on the ice sensor attached to the housing, wherein the pre-determined amount of ice sends a fourth signal to the control unit, further wherein if ice is detected on the ice sensor then activating the motor to operate the rotatable wheel, wherein the rotatable wheel moves the apparatus along the power line in a second direction, otherwise docking at the first stop member if no ice is detected;
l) activating a second plurality of heating elements attached to a second side of the housing that is moving forward in the second direction, wherein the second plurality of heating elements provide heat to the second side of the housing;
m) activating a second plurality of scraper members attached to the second side of the housing that is moving forward in the second direction, wherein the second plurality of scraper members move into scraping engagement with the power line;
n) detecting a second stop member affixed to the power line with a second physical proximity sensor attached to the second side of the housing and sending a fifth signal to the control unit;
o) de-activating the motor and the second plurality of heating elements and disengaging the second plurality of scraper members from the power line;
p) detecting ice formed on the ice sensor attached to the housing, wherein the pre-determined amount of ice sends a sixth signal to the control unit; and
q) repeating steps e) through k) above if ice is detected on the ice sensor, otherwise docking at the second stop member if no ice is detected.

16. The method of claim 15, further comprising a rotatable balance wheel that engages the power line within the internal channel and moves along the power line.

17. The method of claim 15, wherein the first physical proximity sensor and the second physical proximity sensor are selected from the group consisting of pressure, temperature, differential and optical sensors.

18. The method of claim 15, wherein the temperature sensor is selected from the group consisting of infrared hear sensors, optical pyrometer, fiber optic thermometer, an acoustic meter, an ultrasonic meter, thermocouples, bimetallic elements, temperature probes and or a heat sensor.

* * * * *